(12) United States Patent
Haikin

(10) Patent No.: US 8,687,091 B2
(45) Date of Patent: Apr. 1, 2014

(54) IMAGE CAPTURING SYSTEMS AND METHODS UTILIZING CUSTOMIZABLE LOOK MANAGEMENT

(75) Inventor: John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 593 days.

(21) Appl. No.: 12/939,028

(22) Filed: Nov. 3, 2010

(65) Prior Publication Data

US 2012/0105678 A1 May 3, 2012

(51) Int. Cl.
*H04N 5/76* (2006.01)

(52) U.S. Cl.
USPC ...................................... 348/231.6

(58) Field of Classification Search
USPC .................................... 348/231.99
See application file for complete search history.

(56) References Cited

U.S. PATENT DOCUMENTS

| | | | |
|---|---|---|---|
| 6,070,018 A | 5/2000 | Matsushita | |
| 6,122,006 A * | 9/2000 | Bogdanowicz et al. | ... 348/222.1 |
| 6,657,658 B2 | 12/2003 | Takemura | |
| 6,972,828 B2 | 12/2005 | Bogdanowicz et al. | |
| 7,199,829 B2 | 4/2007 | Matsui et al. | |
| 7,394,565 B2 | 7/2008 | Stokes et al. | |
| 2005/0134801 A1* | 6/2005 | Bogdanowicz et al. | ........ 352/38 |
| 2007/0121139 A1 | 5/2007 | Silverbrook et al. | |
| 2007/0291338 A1 | 12/2007 | Williams et al. | |
| 2008/0273794 A1 | 11/2008 | Samworth | |
| 2008/0303913 A1 | 12/2008 | Mertens | |
| 2009/0228955 A1 | 9/2009 | Gibson et al. | |
| 2011/0222761 A1* | 9/2011 | Haikin | .......................... 382/162 |

OTHER PUBLICATIONS

"Windows Color System: The Next Generation Color Management System" White Paper, Published: Sep. 2005 by Microsoft Corporation.

* cited by examiner

*Primary Examiner* — Gary C Vieaux
(74) *Attorney, Agent, or Firm* — Canon U.S.A., Inc., IP Division

(57) ABSTRACT

An image capturing apparatus that includes an image capture unit, an interface unit, a processing unit, and a display unit, wherein the image capture unit captures an image, the memory unit stores the image, the interface unit loads one or more look transforms into the image capturing apparatus, the processing unit converts color signals of the image from values of the image capturing apparatus into an output rendering space using a device-independent color space, automatically applies the look transform(s) to the image, and generates a rendered image, which is then displayed by the display unit.

18 Claims, 13 Drawing Sheets

IMAGE CAPTURING SYSTEMS AND METHODS UTILIZING CUSTOMIZABLE LOOK MANAGEMENT

BACKGROUND

1. Field of the Invention

The present invention generally relates to photography and image capturing and, more particularly, to an image capturing apparatus, method, and computer readable medium utilizing customizable look management.

2. Description of the Related Art

Photographers generally sell their work based on their ability to impart an artistic look to a photographic image. This is generally done by a careful arrangement of the scene, including lighting, makeup, and other physical aspects, followed by the use of software tools, such as Adobe® PhotoShop®. The artistic look can take many forms but often it affects the colors in the picture. A professional photographer is very careful to protect his 'look' because that look is the reason that they are chosen by a client over another photographer with a different look.

Professional photographers working in a studio or on the fashion runway will often take many shots under very similar lighting. The setup for a 'shoot' can be very time consuming. If a problem arises during the processing of the photographs after the 'shoot' it may be very expensive or even impossible to reproduce the conditions and valuable time and money will be lost.

Photographers typically capture their images in a raw (unprocessed format) and then apply one or more proprietary color transformations to the colors in the images to attain their characteristic 'look'. Before digital photography, these artists operated using film. Because of the limitations of the film medium, their output was limited to several dozen photographs and so the time required to process all individual images in a 'shoot' was relatively manageable. With digital cameras capable of taking hundreds of photographs in a 'shoot', customers of these artists have been demanding more images and, as a result, the time required to apply the 'look' has gone up. These artists desire a means to apply their 'look' to large numbers of digital photographs almost automatically.

Photographers can perform motion picture photography with cameras where sequential images are captured with varying time durations between each image. Motion picture photography is different from still photography in many ways. However, there are some similarities as well. Specifically, in both applications, artistic look needs to be introduced.

In the motion picture industry, look management is often achieved using color look-up tables (LUTs). Several digital motion picture cameras allow for the installation of LUTs. LUTs allow for the application of a look to the captured picture. LUTs normally convert film-centric RGB (Red-Green-Blue) values to revised film-centric RGB values and do not take advantage of color appearance or the human visual system.

Image capturing apparatuses, such as digital cameras, capture images and store them into a memory in one of two forms. High-end cameras can store the images in a raw (unrendered) form, which performs minimal processing on the images. This form is not viewable directly on an LCD (liquid crystal display) panel of the camera, nor can it be printed out directly. The second form, which is available on all cameras, is a rendered form. In this case, the colors in the image are converted to corresponding colors in a working color space, such as sRGB, AdobeRGB, or ProPhotoRGB. Very few digital motion picture cameras provide for raw, unrendered output; instead, they produce pictures that are rendered to one of several film standards color spaces, that is, they try to simulate the production of a motion picture on film.

In a rendered form, the images are usually processed to generate a set of colors that can be viewed on the LCD panel. However, the color capabilities of the LCD panel may not match the color capabilities of a final output device such as a printer. Because the camera is able to capture colors that are not available in the rendered output color space, during the rendering process these colors must be 'gamut mapped' to make them conform to the color range limits (gamut) of the output-referred color space to which the images are rendered. Ordinarily, the output referred-color space is a standard RGB color space, such as sRGB, Adobe RGB, or ProPhoto RGB. Because gamut mapping changes the image and because the changes are performed by the digital camera itself outside the control of the photographer, professional photographers usually prefer to use the camera in raw, unrendered mode so that they can control the rendering themselves.

In addition, if the final result of the images is to be printed, the rendering process needs to take into account the color capabilities (gamut) of the final output printer. Because the camera is generally not aware of the gamut of the final output printer, the image displayed on the LCD screen may not be a good depiction of the final result.

Rendering of color information is performed using a color management system (CMS). A color management system is a software system that is used to convert colors from one color space to another. This involves conversion of colors from an input device color space, gamut mapping from the color gamut of the input device and the output device, and conversion to the color space of the output device. A digital camera generally uses an internal color management system to perform this work when the images are rendered. This internal color management system is optimized for use with the digital camera as the input, a preset gamut mapping method, and a limited set of output color spaces, such as sRGB or AdobeRGB.

There are a number of different color management system architectures. Some color management systems, such as those used in imaging devices such as cameras and printers, use a very simple architecture that performs very simple rendering from one color system to another. Often, this is done using LUTs. More sophisticated color management systems, however, perform multiple steps in the rendering process with an aim at achieving superior results. These architectures generally make use of an intermediate, device-independent, color space.

The "Windows Color System" provided by Microsoft Windows® Vista and the Canon Kyuanos system change colors in several distinct steps. First, the colors in the image are converted to a colorimetric representation, that is, they are converted to CIEXYZ as defined by the Commission Internationale de l'Eclairage (CIE) as a mathematical color space that describes color in terms of synthetic primaries X, Y and Z. The primaries are imaginary mathematical constructs that model responses of the human eye to different wavelengths of light. This is a device independent form of color representation that models the human visual system.

The second step is converting the CIEXYZ representation to a color appearance representation in the color appearance space called CIECAM02, which transforms physical measurements of the color stimulus and viewing environment into relative perceptual attributes including lightness, chroma and hue. This color representation provides a model of color that is 'linear' with respect to human perception. While the image is encoded in CIECAM02, gamut mapping is performed. Gamut mapping is performed in color appearance space because it is easier due to the linearity of the space. Gamut mapping involves the use of algorithms which convert the coordinates of color values of one color space into another. Then the gamut mapped image is converted back to CIEXYZ and finally the results are converted to RGB in the desired rendering color space.

The use of computer based tools for applying artistic look has a disadvantage. While computer based tools, such as Adobe® Photoshop®, are available to apply custom artistic transforms to a batch of images, the tools operate in a computer and must be used after a photography shoot is completed. Currently, there is not a good way to apply these look operations at the time photographs are being taken so as to 'preview' the images when it is still possible to retake a shot.

In professional digital photography, there is a need for a way to apply an artistic look to a series of images in such a manner that the look can be used with different cameras and the results of the use of the look, as they would appear on the final output device, can be previewed by the photographer at the time the photographs are taken so that changes in either look or studio setup can be performed right away, while the models and studio are at hand. To satisfy this need, we propose image capturing systems and methods utilizing customizable look management provided by the photographer.

SUMMARY

The present disclosure is directed to image capturing systems, image capturing apparatuses, for example, a digital camera, image capturing methods, and computer readable mediums that employ an internal color management system that uses a device-independent intermediate color space for conversion of color signals from a captured image to an output-referred color space. The color management system provides a means to insert an optional 'look transform' which applies one or more artistic look transforms to the images while they are in the device-independent color space. The look transforms, which are composed off-line in a digital computer using a custom look transform builder and editor, may be loaded into the image capturing apparatus by the photographer before capturing the image. Additionally, the image capturing systems, apparatuses, methods, and computer readable mediums may generate one or more soft proofs of the image as it would appear on a selected output device and render the soft proofs on a display of the image capturing apparatus.

One embodiment of an image capturing apparatus comprises an image capture unit configured to capture an image, a memory unit configured to store the image, an interface unit configured to load at least one look transform into the image capturing apparatus, a processing unit configured to convert color signals of the image from values of the image capturing apparatus into an output rendering space using a device independent color appearance space, to automatically apply the at least one look transform to the image, and to generate a rendered image, and a display unit configured to display the rendered image.

One embodiment of a method for image capture and processing for use in an image capturing apparatus comprises storing at least one look transform on an image capturing apparatus, wherein the at least one look transform operates in a device independent color space, capturing an image in a device dependent color space with the image capturing apparatus, converting color signals of the image from the device dependent color space into an output rendering space using a device-independent color space, wherein the at least one look transform is applied to the image during the conversion, and rendering the image in the image capturing apparatus.

One embodiment of a computer readable medium has computer-executable instructions stored thereon that, when executed by one or more processors on a computing device, cause the computing device to perform operations comprising storing at least one look transform on an imaging capturing apparatus, capturing an image in an input device dependent color space of the image capturing apparatus, converting color signals of the image from the input device dependent color space into a device-independent color space, transforming the color signals of the image with the least one look transform, converting the color signals of the image from the device-independent color space to an output device dependent color space, and rendering the image in the image capturing apparatus.

Further features and aspects of the present invention will become apparent from the following detailed description of illustrative embodiments with reference to the attached drawings.

DETAILED DESCRIPTION OF THE EMBODIMENTS

Illustrative embodiments of the invention will now be described in detail below with reference to the accompanying drawings. The relative layout of constituent elements exemplified in the embodiments should appropriately be changed in accordance with the arrangement and conditions of the apparatus to which the present invention is applied. The present invention is not limited to these illustrative embodiments.

Figure 1:
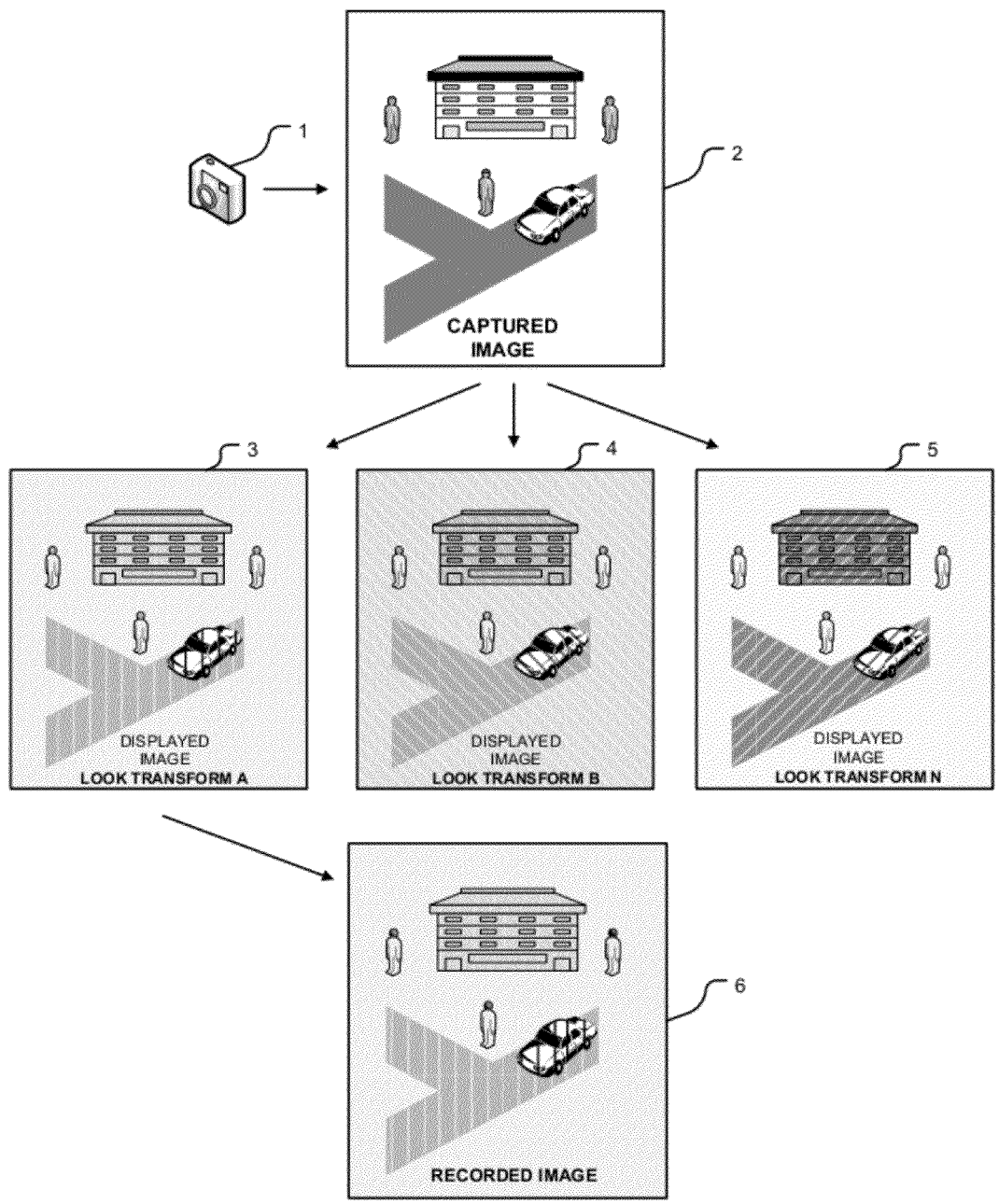
FIG. 1 illustrates an embodiment of an image capturing method.

FIG. 1 generally illustrates an overview of an embodiment of an image capturing process. An image capturing apparatus 1 captures an image 2 of a scene. While the image capturing apparatus 1 is represented as a digital still camera for illustrative purposes, the image capturing apparatus 1 may be configured in a variety of other configurations, such as, for example, a digital video camera, a portable communication terminal (e.g., a cell phone), a pager, a radio telephone, a personal digital assistant (PDA), a Moving Pictures Expert Group Layer 3 (MP3) player, and/or the like. Similarly, other figures illustrate various image capturing apparatuses represented as various forms of digital still cameras including, for examples, exemplary embodiments of Canon cameras. These illustrations are merely representative and the image capturing apparatuses shown therein may have various other configurations, as described above.

In accordance with an exemplary embodiment of the present invention, the image capturing apparatus 1 is configured with a color management system that includes a look transform that enables a photographer to take numerous images with an artistic 'feeling' associated with one or more selected look transforms being applied automatically to each image to modify dimensions of color appearance, including, but not being limited to, brightness (luminance), lightness, colorfulness, chroma, saturation, and hue. As used herein, a "look transform" refers to style parameters and/or characteristics identified by an artist that are used to modify the appearance of a captured image. The look transform enables the artist to encapsulate an artistic 'feeling' into a look transform using a color management system on any computer platform or electronic imaging device. One or more of these look transforms created by the artist can be loaded into or removed from the image capturing apparatus 1, for example by using a wired or wireless interface. In another approach, the look transforms can be loaded via a removable memory card inserted into/connected to the image capturing apparatus 1. Look transforms can be represented as look up tables, as parameters to mathematic algorithms, or as computer program segments (e.g., plugins) that can be executed by the imaging device. In this last case, the computer program segments can be represented as actual machine code or as interpretive computer code.

Color management systems commonly transform colors from a device, such as a computer monitor, a camera, a scanner, etc., hereinafter referred to as an input device, to an output device, such as a printer, a personal digital assistant (PDA), a cell phone, a television, a monitor, etc., hereinafter referred to as an output device. The color values of an input image are transformed from the color space of the associated input device to color values of the color space of the associated output device; this process involves a conversion of the input device space colors to some internal color representation, an adjustment of these colors so as to ensure that they lie within the color range of the output device color space (gamut mapping), and a conversion from this gamut-mapped result to corresponding colors in the output device color space. Reference will be made herein to various color terms known to those skilled in the art, including color spaces, color profiles, color values, color models, color imaging, color transformations, gamut mapping, rendering intents, and/or the like. Reference will also be made to various systems, software, and programming known to those skilled in the art.

In FIG. 1, an artist creates one or more creative look transforms using a look transform builder/editor application running on a computer system. After creating the look transform(s) on the computer system, a photographer obtains the look transform(s) from the artist, transfers the look transform(s) into the image capturing apparatus 1, using, for example, a removable memory card. After choosing a particular scene, the photographer captures an image 2 with the image capturing apparatus 1. The photographer can then select and view the captured image 2 using one or more look transforms on the image capturing apparatus 1, e.g., look transform A 3, look transform B 4, ..., look transform N 5 (N<∞). Finally, the photographer can render and record one or more image 6 after processing the captured image using the color management system in the image capturing apparatus 1 with application of the desired look transform(s). Because the photographer may immediately review the transformed image, the photographer may easily adjust the scene and/or the image capturing apparatus based on the photographer's review of the applied look transforms and/or capture additional images of the scene (which may have been adjusted).

Additionally, the photographer may soft proof the appearance of the transformed image. The image capturing apparatus may store output device color profiles for one or more output devices, and the photographer may select an output device color profile for the image capturing apparatus to apply to the transformed image. The output device color profile may then be immediately applied to the transformed image, and the transformed image may be displayed on the imaging device for verification and presented to the photographer.

Figure 2:
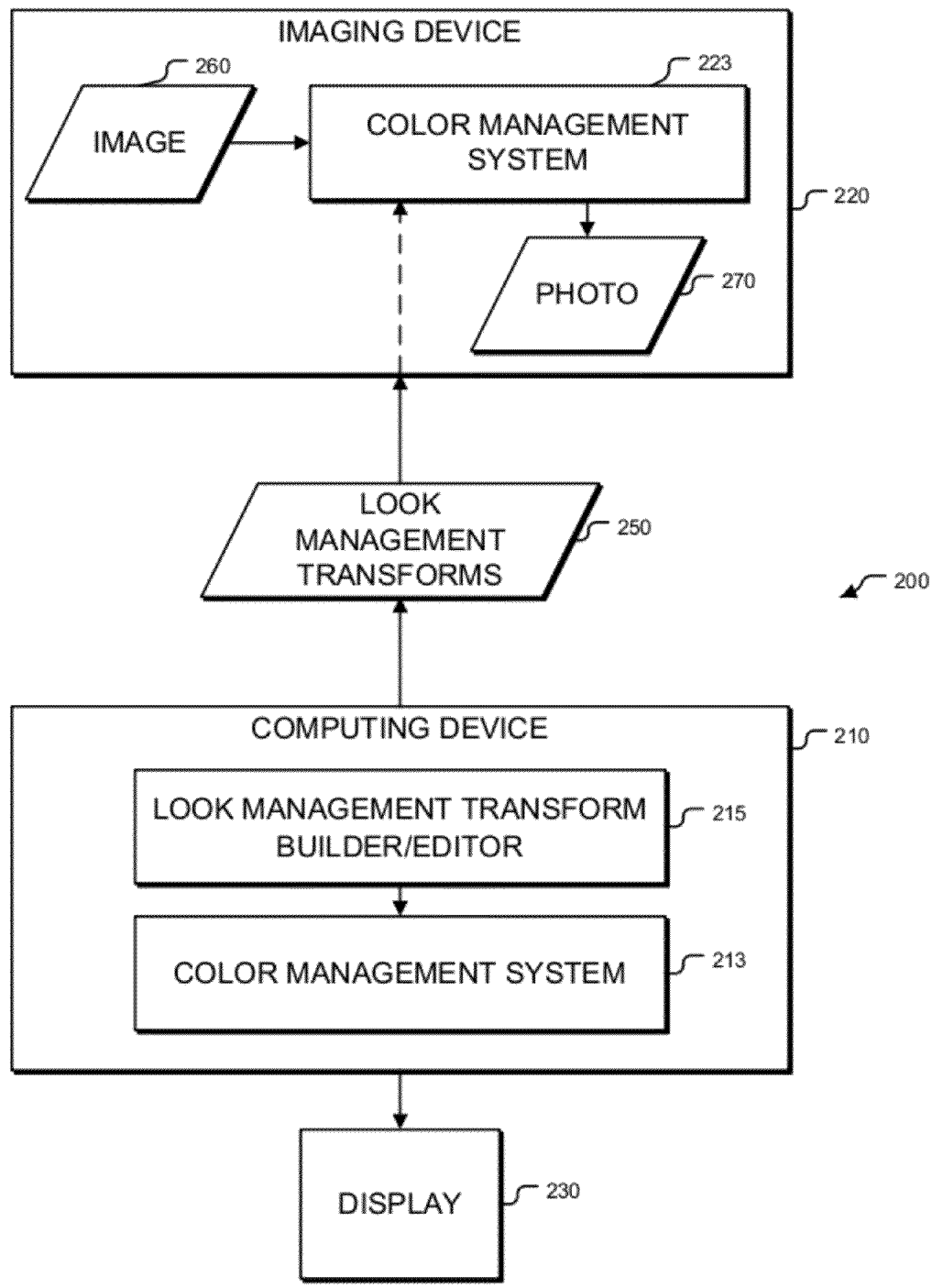
FIG. 2 is a block diagram illustrating an embodiment of a system 200 for implementing customizable look management.

FIG. 2 is a block diagram illustrating a system 200 for implementing customizable look management. The system includes a computing device 210, an imaging device 220, and a display 230. The computing device includes a color management system 213 and a look management transform builder/editor 215 that allows an artist to create and/or edit look management transforms, and the computing device 210 communicates with the display 230. The display 230 allows the artist to view the effects of the look management transforms on an image.

One or more look management transforms 250 may be transmitted to the imaging device 220. The imaging device includes a color management system 223. The imaging device 220 captures an image 260, and the color management system 223 uses the received look management transforms 250 to transform the image 260 to create a photo 270. The imaging device 220 may render the photo 270 for a photographer on a display.

Figure 3:
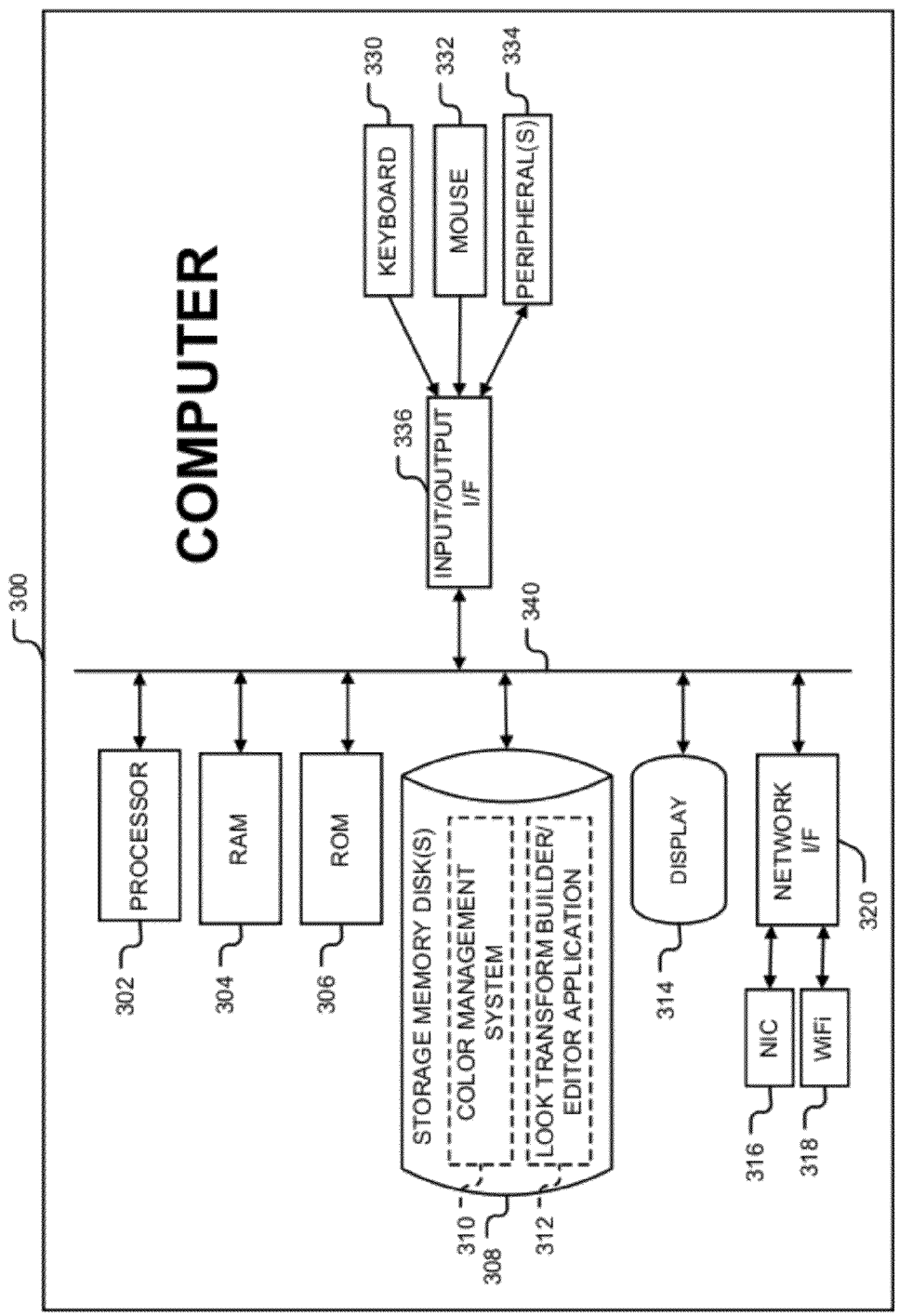
FIG. 3 is a block diagram illustrating an embodiment of the internal architecture of a computer.

FIG. 3 is a block diagram illustrating the internal architecture of computer 300 according to an exemplary embodiment of the present invention. The computer 300 includes a processor 302, a RAM 304, a ROM 306, storage memory disk(s) 308, a display 314, a keyboard 330, a mouse or pointer 332, peripheral(s) 334, and an input/output I/F 336 that are interconnected by a system bus 340. A color management system 310, which includes the ability to apply a look transform to an image, and a look transform builder/editor application 312 are illustrated as being stored within the storage memory disk(s) 308. While the color management system 310 and the look transform builder/editor application 312 are illustrated as being stored within the storage memory disk(s) 308, they may be stored in other devices/locations, for example the ROM 306 and/or the RAM, or accessed over a network.

The processor 302 retrieves instructions from the color management system 310 and the look transform builder/editor application 312 to execute and receives data to process in order to execute the processes of the present invention. The RAM 304 may be a non-volatile memory unit that stores instructions and data when no power is provided to the computer 300. The ROM 306 stores static data and instructions used by the processor 302 and other interconnected components of the computer 300. The display 314 displays images generated by the computer 300. The keyboard 330 and pointer 332 enable a user to interact with and provide/retrieve information and commands to the computer 300. The peripherals 334 may include printers to print images generated by the computer 300. The bus 340 couples the computer 300 to a network so the computer 300 can be part of a network of computers, such as a local area network (LAN), a wide area network (WAN), an intranet, the Internet, and/or the like. The particular computer 300 configuration may be modified and/or varied according to particular desires of the user.

FIGS. 4-9 illustrate embodiments of processes and operations. The following processing may be performed by an image capturing apparatus 100 (further described below in reference to FIG. 11) when a system control unit 50 executes a control program. The following processing may be performed by other devices and systems as well, for example a computer 300 when the processor 302 executes a control program stored in the storage memory disk(s) 308. For discussion purposes, in the following paragraphs the image capturing apparatus 100 may be referred to as a digital camera. However, any image capturing device that would enable practice of the systems and methods described herein is applicable. Additionally, other embodiments of the processes and operations described herein may omit steps, may add steps, may change the order of the steps, may combine steps, and/or may divide steps into separate steps.

Figure 4:
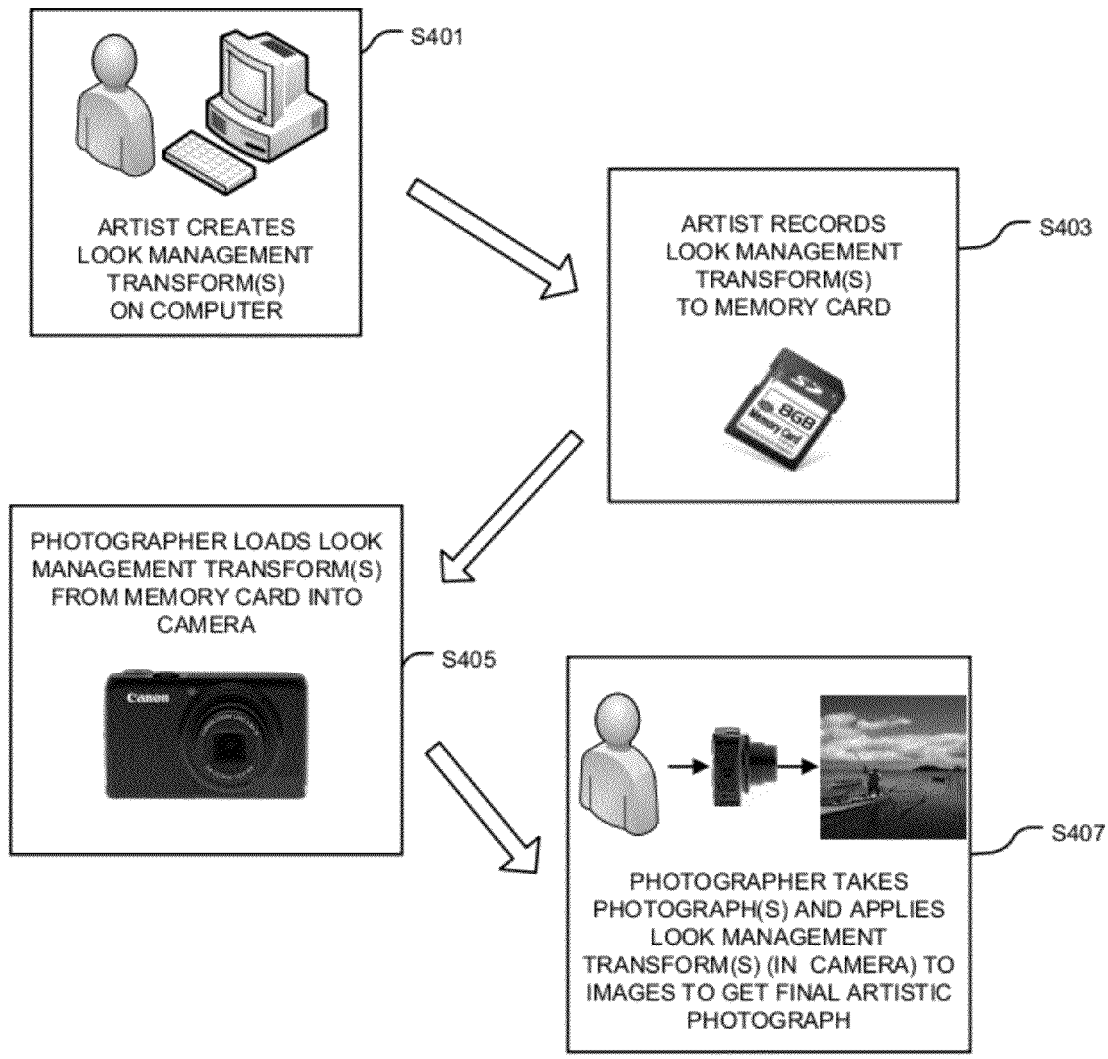
FIG. 4 is flowchart that illustrates one embodiment of a system overview.

FIG. 4 is a flowchart that illustrates an embodiment of system overview. By way of example but not limitation, computer 300 will be referenced in the following paragraphs. In step S401 of FIG. 4, an artist creates one or more look transforms external to the image processing apparatus 100, for example by using the look transform builder/editor application 312 on computer 300. Additionally, in step S401 the artist may load and edit previously created look management transforms.

In step S403, the artist records the look transform(s) created (or edited) on the computer 300 onto a memory card connected with the computer 300. In another embodiment, the created look transform(s) may be recorded/stored on other mediums such as a USB flash drive, compact disc (CD), remote storage server, etc. In step S405, a photographer inserts the memory card into image capturing apparatus 100, and the look transform(s) is loaded from the memory card into the image capturing apparatus 100. In another embodiment, the photographer transfers the recorded look transform(s) onto the image capturing apparatus 100 by the method for transferring data associated with the recording medium on which the look transform(s) is recorded (e.g., a wired connection, a wireless connection). For discussion purposes, the following paragraphs will reference a memory card as the storage medium on which the digital images are recorded/stored.

In step S407, the photographer obtains a digital image of a subject and applies a selected look transform(s) stored in the image capturing apparatus 100 to the digital image. The resulting image is displayed on the display unit 54. If the photographer is satisfied with the image after the look transform has been applied, the photographer saves the modified image. If the photographer is not satisfied with the image, then the photographer can select and apply a different look transform.

Figure 5A:
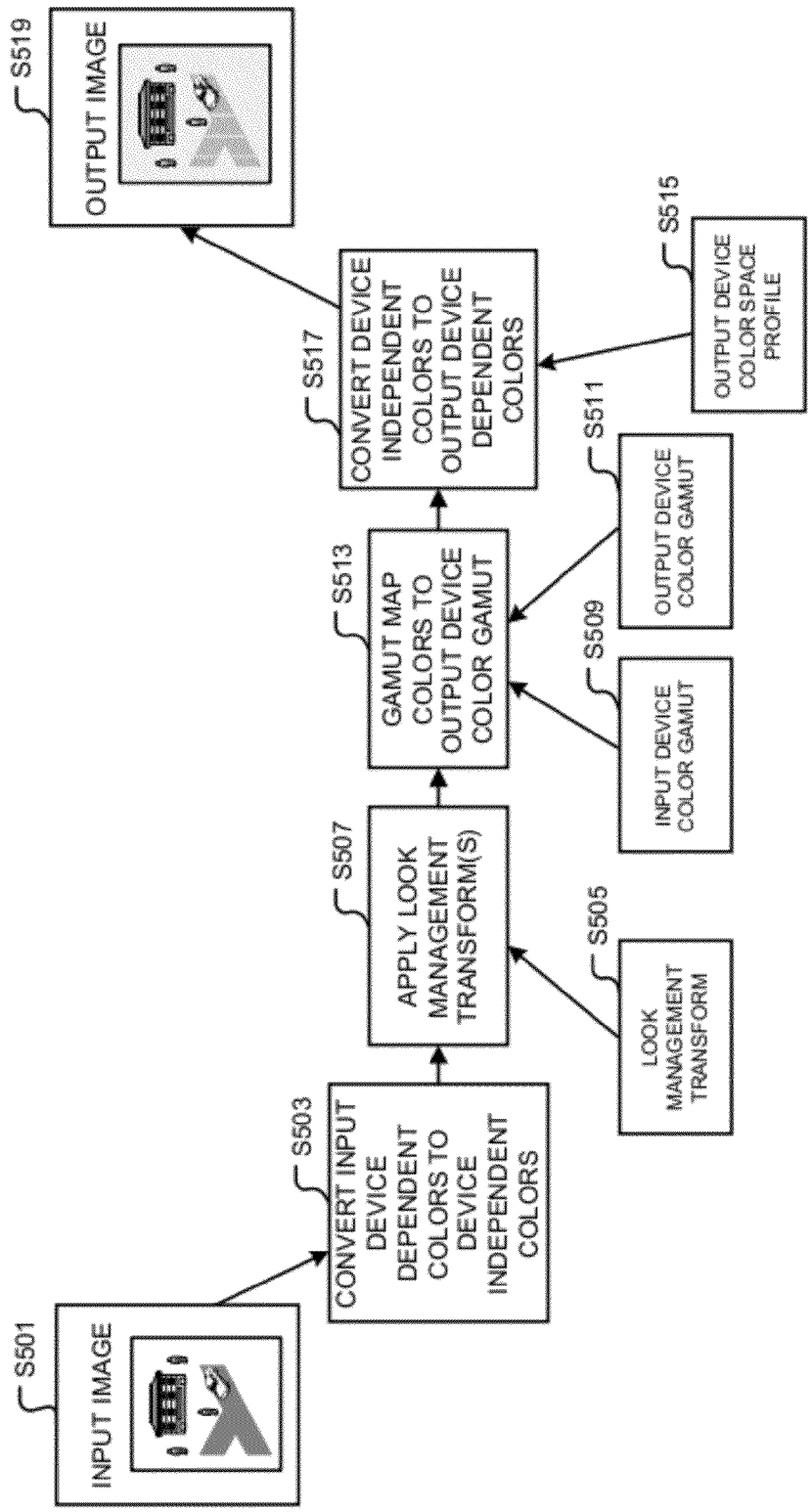
FIG. 5A is a flowchart illustrating an embodiment of a color management process that integrates look transforms and that uses model-based color management.

FIG. 5A is a flowchart illustrating an embodiment of a color management process that integrates look transforms and that uses model-based color management. It may be partially or entirely implemented as, for example, processing that occurs in the computer 300 during the execution of the look transform builder/editor application 312. Additionally, it may be partially or entirely implemented as processing that occurs in the image capturing apparatus 100 during the rendering of images. In step S501, an input image is provided to the color management system. In step S503, input device-dependent colors of the input image are converted to device independent colors (e.g., mapped from a device dependent color space to a device independent color space). Conversion can be performed using device model profiles, color appearance profiles, and device models using model-based color management system such as Canon Kyuanos or Windows WCS.

One or more look transform(s) which are selected externally to the color management system, are applied to the device independent colors resulting from step S503. In step S507, the selected look transform(s) are applied to the image produced in step S503, and dimensions of color appearance of the input image, such as brightness (luminance), lightness, colorfulness, chroma, saturation, and hue, are modified based on style parameters and characteristics identified by the artist. The color gamuts of the input device and the output device are provided to the color management system in steps S509 and S511. In step S513, the color management system gamut maps the look transformed input image from the input device gamut to the output device gamut.

In step S515, the output device color profile is provided to the color management system, and in step S517 the image is converted from the device independent color space to the output device dependent color space. In step S519 an output image is rendered that reflects the look transformed input image.

Figure 5B:
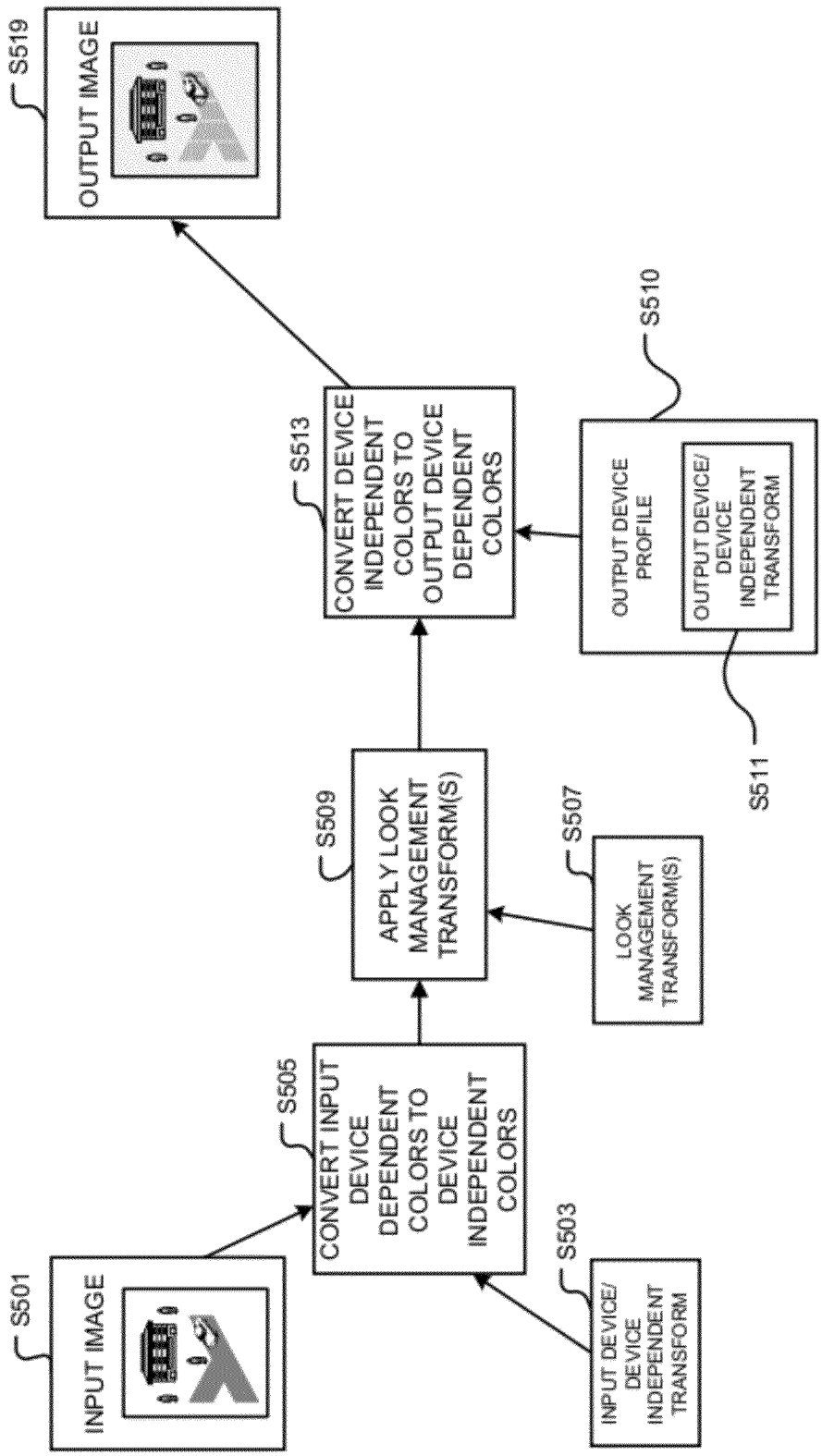
FIG. 5B is a flowchart illustrating an embodiment of a color management process that integrates look transforms and that uses transform-based color management.

FIG. 5B is a flowchart illustrating an embodiment of a color management process that integrates look transforms using transform-based color management. Color transforms in a transform-based color management system are encoded as look up tables (LUTs) or parameters to fixed algorithms such as the Matrix/TRC model used by the ICC for monitor devices. In step S501, an input image is provided to the color management system. In step S503, the transform that maps input device dependent colors to device independent colors is provided to the color management system. Next, in step S505, input device dependent colors of the input image are converted to device independent colors using the transform provided in step S503.

Moving to step S507, look management transforms are provided to the color management system. In step S509, the look management transform(s) are applied to the input image (which has been converted to device-independent colors). In step S510 a transform-based profile, such as an ICC profile, is provided to the color management system. It contains a transform to convert device-independent color to device dependent color. In step S511, transforms that map device independent colors to output device colors are extracted from the output device profile S510, and, in step S513, these transforms are used to convert device independent colors in the transformed image to output device dependent colors to create an output image. Next, in step S519 the output image is rendered on the output device.

Figure 6:
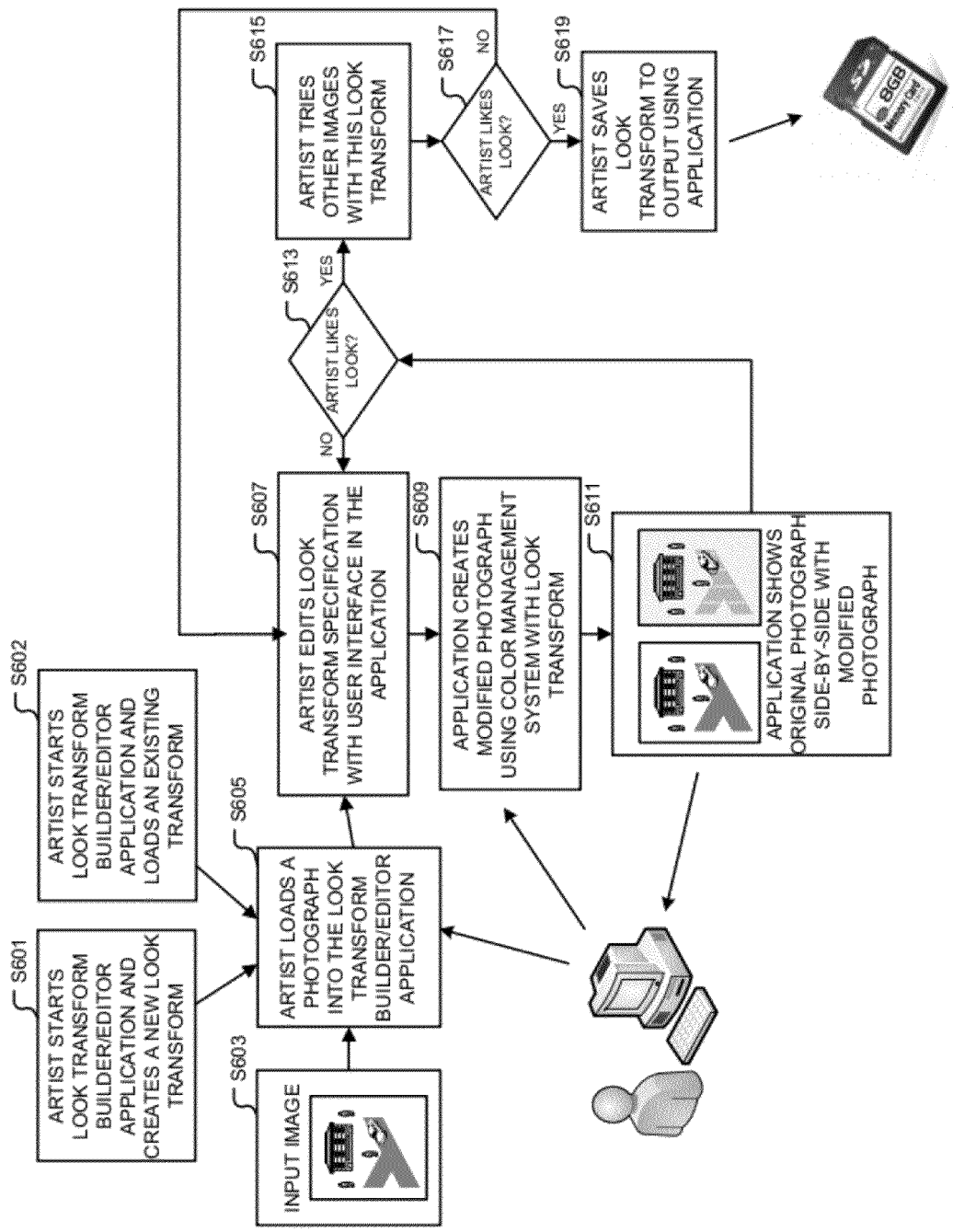
FIG. 6 is a flowchart that illustrates an embodiment of the creation and editing of a look transform.

FIG. 6 is a flowchart that illustrates an embodiment of the creation and editing of a look transform, for example on the computer 300. In step S601, an artist starts the look transform builder/editor application 312 on the computer 300 and creates a new look transform; the look transform created in this step has a 'null' affect, that is, it makes no changes to any colors. When an existing look transform is being edited, in step S602, the artist starts the look transform builder/editor application 312 on the computer 300 and loads an existing look transform from a computer readable storage device, for example an external medium. The artist obtains an input image in step S603. In step S605, the artist loads the input image into the look transform builder/editor application 412. In step S607, the artist creates a new look transform specification or edits an existing look transform specification, for example with a user interface provided by the look transform builder/editor application 312.

In step S609, the look transform builder/editor application 312 creates a modified digital image using the color management system 310 and the particular look transform. The look transform builder/editor application 312 shows the original digital image side-by-side with the modified digital image (e.g., the digital image processed with the created look transform). The artist determines whether the displayed look is acceptable in step S613. If the artist determines that the displayed look is not acceptable, the process returns to step S607 and the artist edits the look transform specification and/or creates another look transform. If the artist determines that the displayed look is acceptable, the process flows to step S615 where the artist modifies other images with the created look transform.

In step S617, the artist determines whether the displayed look is acceptable. If the artist determines that the displayed look is not acceptable, the process returns to step S607. If the artist determines that the displayed look is acceptable, the process flows to step S619 where the artist records/saves the created look transform, for example on the memory card.

Figure 7:
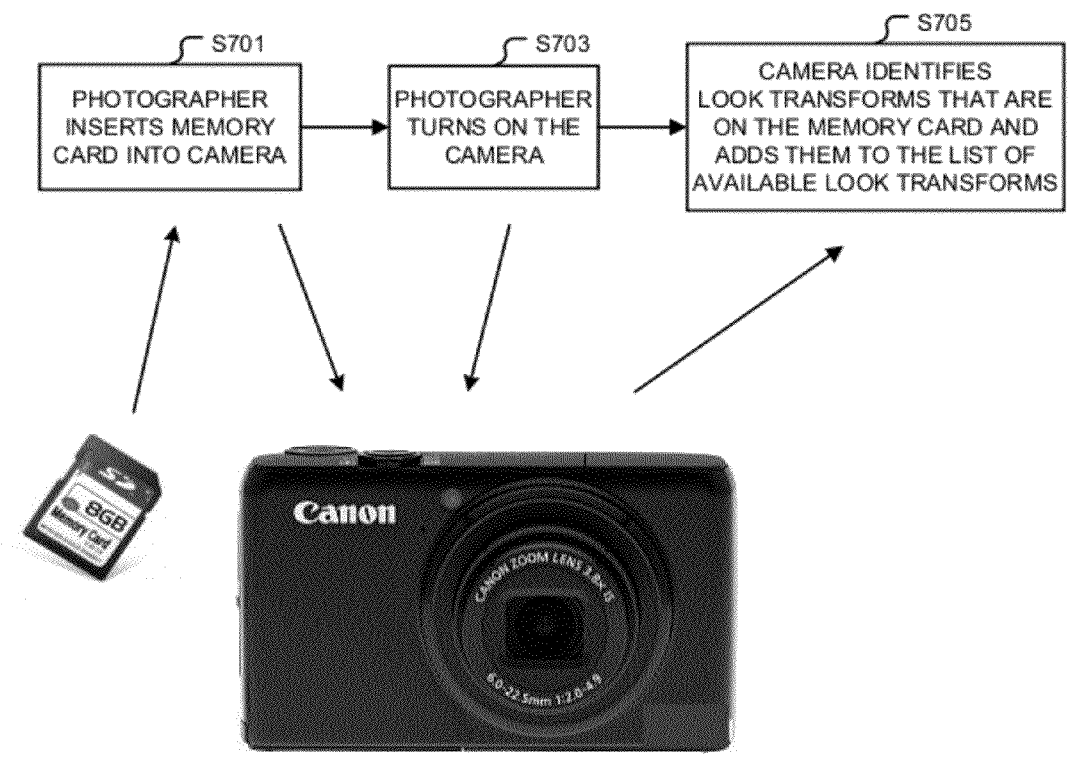
FIG. 7 illustrates an embodiment of the process of loading created look transforms into an image capturing apparatus.

FIG. 7 illustrates one embodiment of the process of loading created look transforms into a camera. In step S701, the photographer inserts a memory card into the camera. In step S703, the photographer turns on the camera. Next, in step S705, the camera automatically identifies look transforms stored on the memory card and adds them to a list of available look transforms previously stored in the camera. In another embodiment, if such a list does not exist, then the camera creates a list using the look transforms obtained from the memory card.

Figure 8:
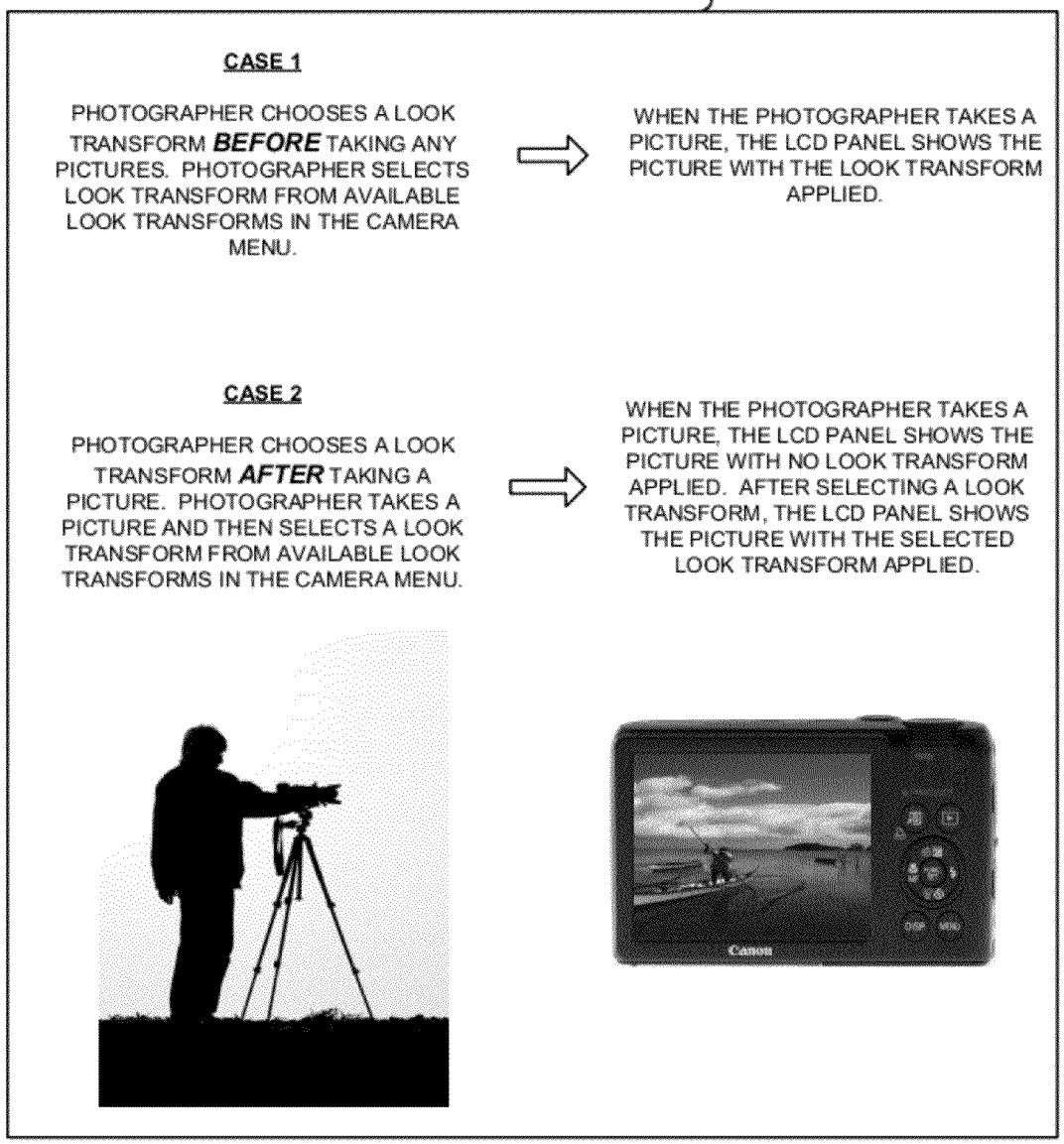
FIG. 8 illustrates an embodiment of the selection of a look transform.

FIG. 8 illustrates an embodiment of the selection of a look transform 800. Two look transform selection cases are illustrated in FIG. 8. In case 1, a photographer chooses a look transform before capturing any images. The photographer selects a look transform from available look transforms stored on the image capturing apparatus 100, using for example, the look transform switch 62. When the photographer captures an image, the LCD panel 28 displays the obtained image with the look transform applied.

The image capturing apparatus renders images using colors for the output device based on a desired color appearance the photographer chooses using the selected look transform. The captured image is stored in the memory 30. In case 2, a photographer chooses a look transform after capturing images. The photographer captures an image and selects a look transform from look transforms stored on the image capturing apparatus 100. When the photographer captures an image, the LCD panel 28 displays the image without application of a look transform. After the photographer selects a look transform, the LCD panel 28 displays the image with the selected look transform applied.

The system control unit 50 executes processing to render the image stored in the memory 30 to create an image according to the selected look transform. The image capturing apparatus 100 performs this rendering when the photographer selects one of the look transforms available in the color management system 300. The system control unit 50 causes the rendered image to be displayed on the LCD panel 28. The photographer then views the rendered image and evaluates whether the selected look transform results in an acceptable rendered image.

Figure 9:
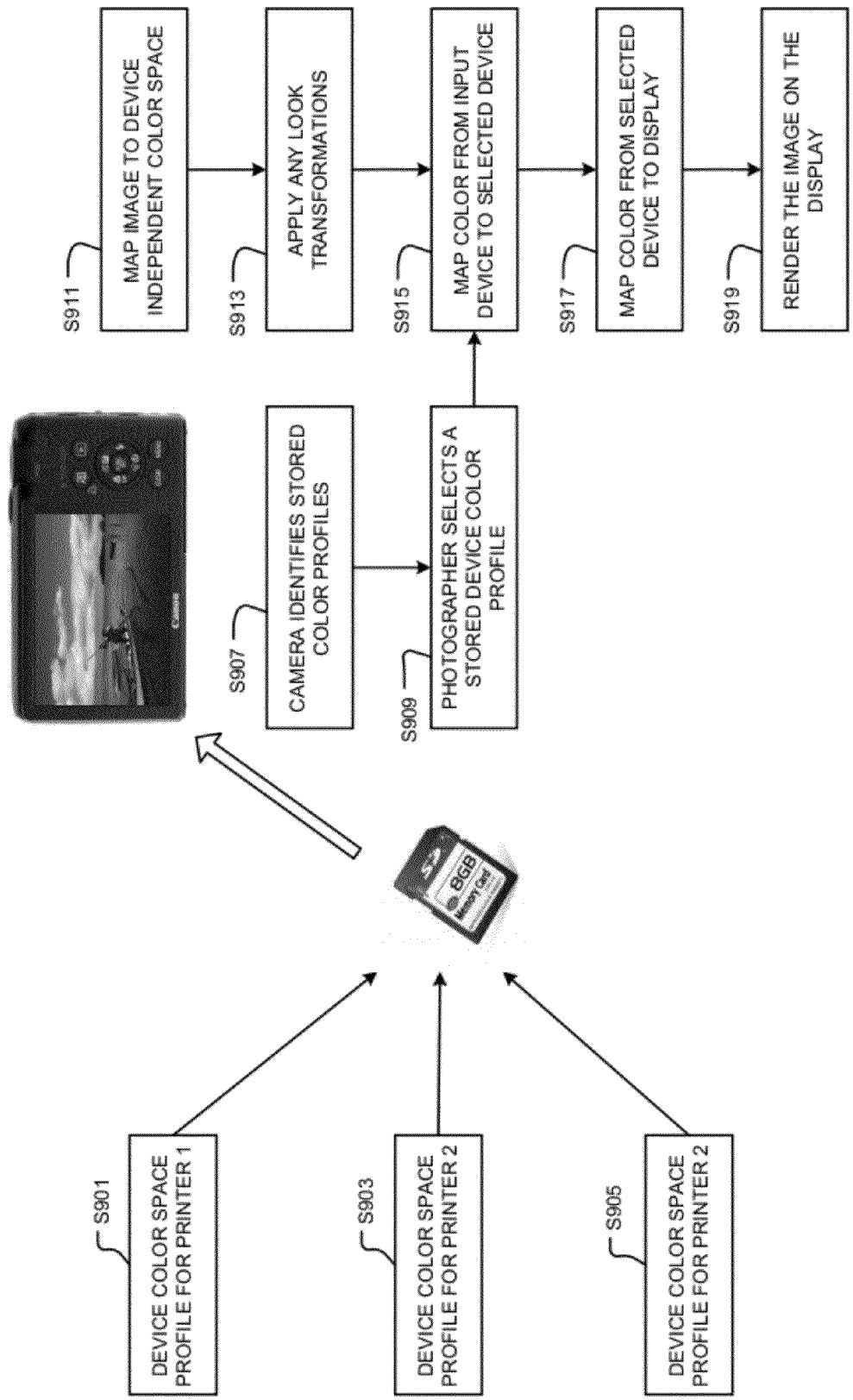
FIG. 9 illustrates an embodiment of output color space selection and soft proofing.

FIG. 9 illustrates an embodiment of output color space selection and soft proofing. Device color profiles for a variety of output devices, such as Printer 1, Printer 2, and a Monitor are stored on a memory card in steps S901, S903, and S905. The device color profiles may be obtained from the manufacturer of the respective device. In step S907, the image capturing apparatus 100 identifies device color profiles stored on the memory card. Next, in step S909, the photographer selects a device color profile stored on the memory card or the default profile (which is no device profile in one embodiment).

In step S911, the colors in a captured image are mapped from the input device color space to a device independent color space, and in step S913, look transforms, if any, are applied to the colors in the device independent color space. Next, in step S915, the colors in the image (which may be transformed) are gamut mapped to the gamut of the selected output device using the stored device color profile. This gamut mapping may be perceptual gamut mapping.

Moving to step S917, the colors are gamut mapped from the gamut of the selected output device to the gamut of the imaging device display. This gamut mapping may be colorimetric gamut mapping. The image is then mapped from the device independent color space to the color space of the imaging device display. Finally, in step S919, the image is rendered on the imaging device display. Most of the colors should be substantially similar or the same as the respective color would be if rendered on the output device. If a color is wrong, then the rendering may display an indicator that the color is wrong, for example showing the color as white or vivid green, or by using a gamut alarm.

Figure 10:
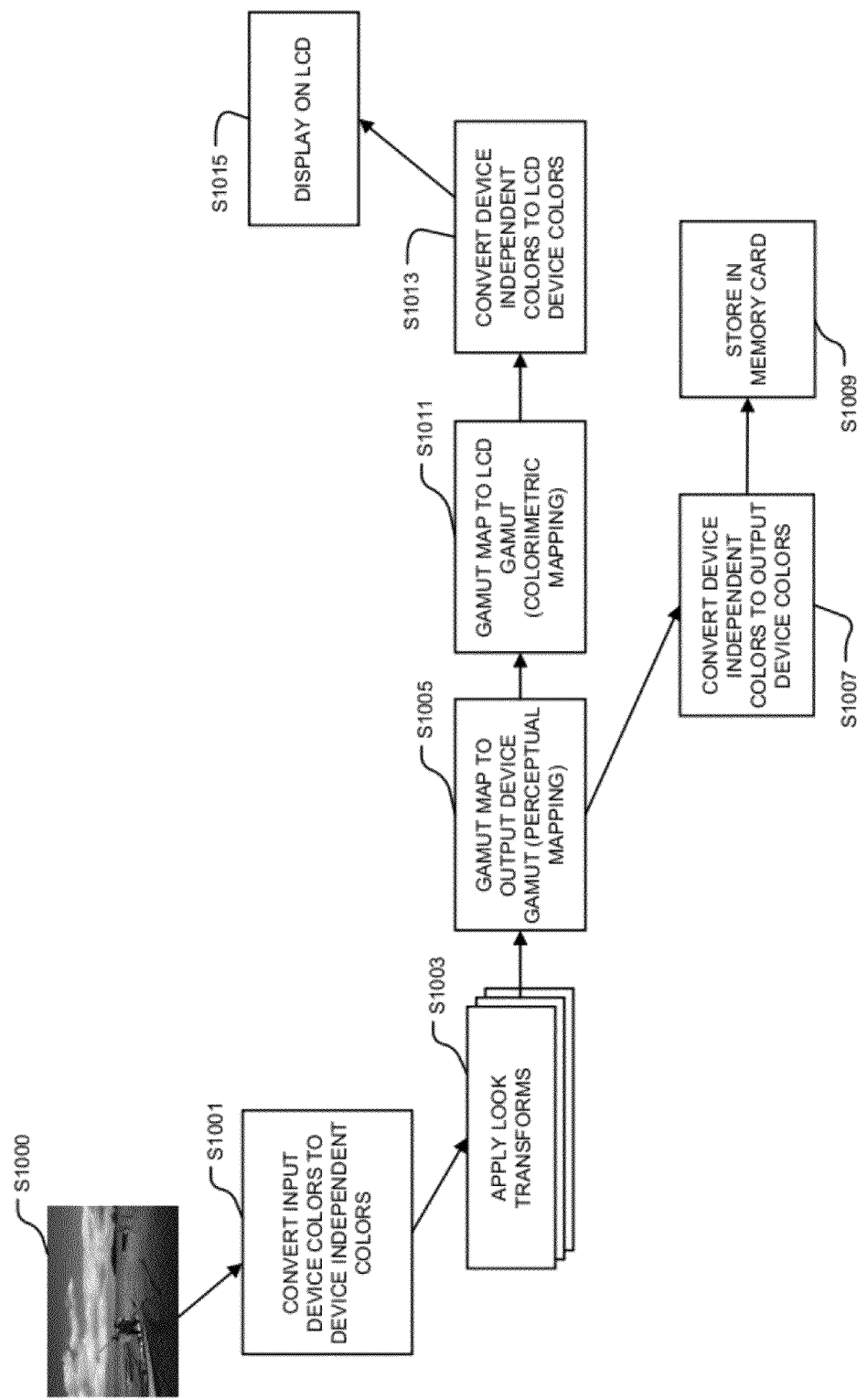
FIG. 10 illustrates one embodiment of a method for soft proofing a transformed image.

FIG. 10 illustrates one embodiment of a method for soft proofing a transformed image. Beginning in step S1000, an image is captured by a device. In step S1001, the image is converted from the input device color space to a device independent color space, and in step S1003, look transforms (if any) are applied to the image. Next, in step S1005, the image is gamut mapped to the output device gamut using perceptual mapping. Depending on the desired output, the method proceeds to step S1007 or step S1011. In step S1007, the image is converted from the device independent color space to the output device color space, and in step S1009 the image is stored on a memory card or another computer readable storage medium.

If the method proceeds to step S1011, the image is gamut mapped to the LCD gamut (or the gamut of another desired display device) using colorimetric mapping. Moving to step S1013, the image is converted from the device independent color space to the LCD color space. Finally, in step S1015, the image is displayed on the LCD.

Figure 11:
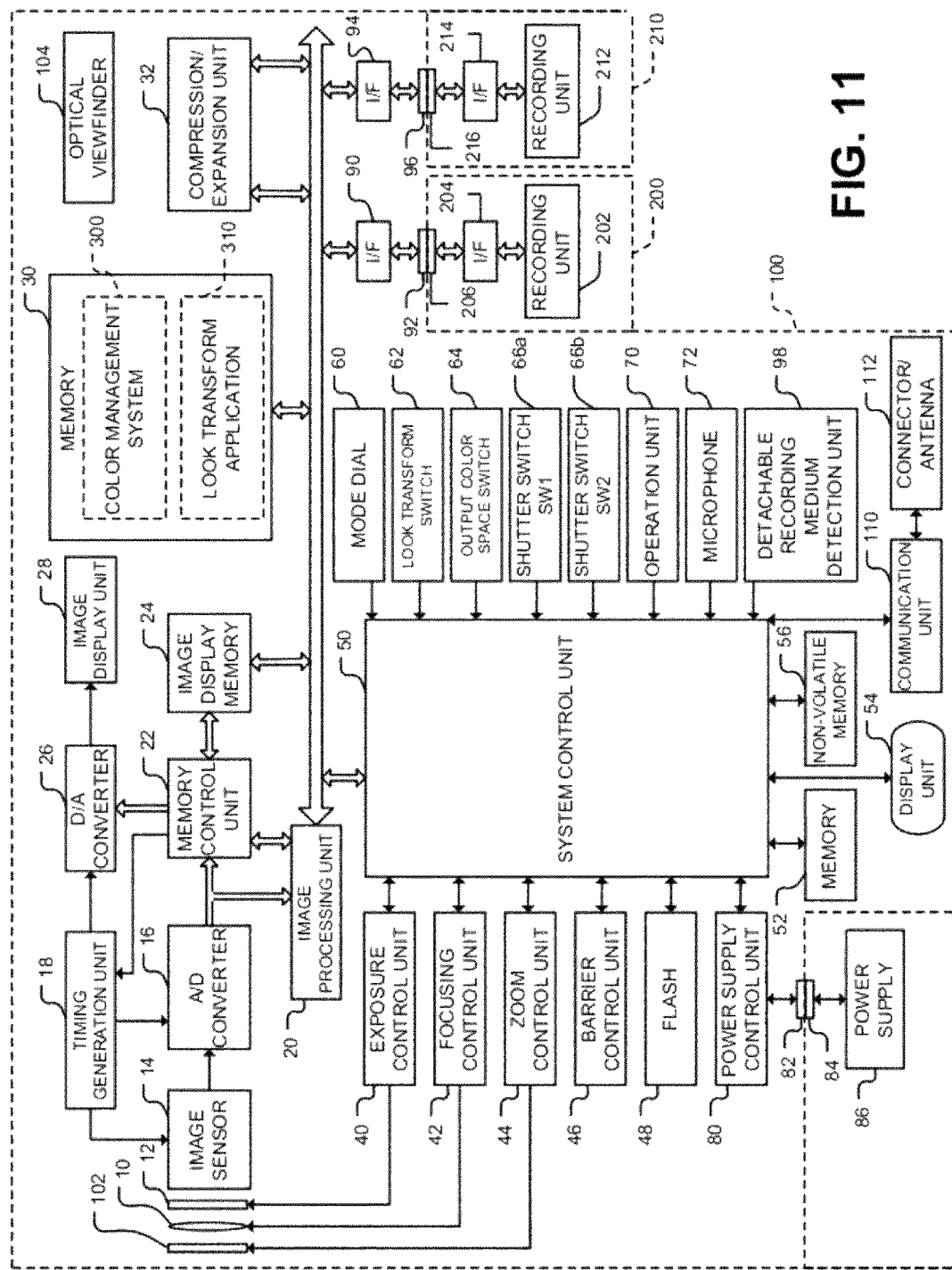
FIG. 11 is a block diagram illustrating an embodiment of a configuration of an image capturing apparatus.

FIG. 11 is a block diagram illustrating an embodiment of a configuration of an image capturing apparatus. The image capturing apparatus 100 includes a protection unit 102, a photographic lens 10, a shutter 12, an image sensor 14, an analog to digital (A/D) converter 16, a timing generation unit 18, an image processing unit 20, a memory control unit 22, an image display memory 24, a digital to analog (D/A) converter 26, an image display unit 28, a memory 30, and a compression/expansion unit 32.

The protection unit 102 serves as a cover to protect an imaging unit of the image capturing apparatus 100, including the photographic lens 10, from soiling and breakage. The photographic lens 10 serves as an optical system, wherein the shutter 12 includes a diaphragm to act as a stop function. The image sensor 14 converts an optical image to electrical signals. The A/D converter 16 converts an analog signal output from the image sensor 14 to a digital signal. The timing generation unit 18 supplies a clock signal and a control signal to the image sensor 14, the A/D converter 16, and the D/A converter 26. The timing generation unit 18 is controlled by a memory control unit 22 and a system control unit 50.

The image processing unit 20 performs predetermined pixel interpolation and color conversion on data received from the A/D converter 16 or the memory control unit 22. The image processing unit 20 also performs a predetermined calculation using the captured image data, and a predetermined calculation using the captured image data and through-the-lens (TTL) auto-white balance (AWB) processing based on the calculation result. In white balance (WB) processing, block integration is performed by dividing a video signal into a plurality of blocks and acquiring an integration value of a color signal for each block to calculate the WB. White search integration is performed by converting a signal value of each pixel in the video signal onto a chromaticity coordinate and acquiring an integration value of the color signal for a predetermined region. A setting of an integration region on the chromaticity coordinate which is used in the white search integration is stored in the image processing unit 20.

The memory control unit 22 controls the A/D converter 16, the timing generation unit 18, the image processing unit 20, the D/A converter 26, the memory 30, and the compression/expansion unit 32. The memory control unit 22 causes the memory 30 to temporarily store captured image(s) in a format that can obtain a result of changing various parameters (such as an exposure value and a white balance value) without deteriorating an image quality. The data of the A/D converter 16 is written in the image display memory 24 or the memory 30 via the image processing unit 20 and the memory control unit 22, or via the memory control unit 22.

The image display unit 28 may be configured as a liquid crystal display (LCD) panel, a thin-film transistor LCD (TFT-LCD) panel, an organic light emitting diode (OLED) display panel, a transparent OLED (TOLED) display panel, a flexible display panel, a three-dimensional (3D) display panel, and/or the like, and may include a light emitting diode (LED), a sound generator, or a combination thereof. Image data, both still and moving images, to be displayed on the image display unit 28 is written in the image display memory 24 via the D/A converter 26. An electronic finder function can be implemented by sequentially displaying the captured image data using the image display unit 28. Further, the image display unit 28 can arbitrarily switch a display screen on and off according to an instruction from a system control unit 50. If the image display unit 28 turns off the display screen, power consumption of the image capturing apparatus 100 can be greatly reduced.

The image display unit 28 may be provided with a touch pad layered thereon in the form of a touch-screen to allow a photographer to review a displayed image on the touch-screen and make changes. User interaction with the touch-screen can occur with a stylus, finger pressure, finger proximity, or the like. By selecting an area of interest with finger pressure, for example, parameters of the selected area can be adjusted. User interaction with the images displayed on the image display unit 28 may also be achieved through voice recognition. The image display unit 28 may also be configured to admit touch-screen inputs, keypad and/or functional/hot buttons into a user interface display to facilitate display, manipulation, and/or transmission of digital media files and/or other imaging functionality.

The memory 30 stores captured still images and moving images and can be configured as any combination of volatile and non-volatile memory. The memory 30 has a storage capacity large enough to store a predetermined number of still images and a moving image corresponding to a predetermined period of time. Therefore, a large amount of image data can be written in the memory 30 at high speed in both a continuous shooting mode of continuously shooting a plurality of still images and a panorama shooting mode. Further, the memory 30 can be used as a work area of the system control unit 50.

The memory 30 also stores a color management system 30 and a look transform 310. The color management system 300 achieves color consistency across various software and hardware platforms and enables a photographer to view, on the image capturing apparatus 100, captured images rendered with a look transform 310. In addition to the look transform 310, memory 30 also includes a color transform engine, one or more color spaces, LUT(s), look executable code(s), and look template(s) (not shown).

A device independent color space, which expresses color in absolute terms, is a predetermined color space that is configured in the color management system 300. The color transform engine maps color values associated with captured images stored in memory 30 to color values of an intermediate color space. The look transform is used to transform the color values of the intermediate color space and is used to map the transformed image to color values associated with an output device, thereby generating an output image using various combinations of one or more colors, e.g. red, green, blue, cyan, magenta, yellow, and black. The output image is then temporarily stored in the memory 30.

The compression/expansion unit 32 compresses and decompresses the image data using adaptive discrete cosine transform (ADCT). The compression/expansion unit 32 reads an image stored in the memory 30 and compresses or decompresses the image, and writes the processed data in the memory 30.

The image capturing apparatus 100 further includes, an exposure control unit 40, a focusing control unit 42, a zoom control unit 44, a barrier control unit 46, and a flash unit 48

The system control unit 50 controls the image capturing apparatus 100. More specifically, the system control unit 50 is configured to perform look transform processing in accordance with the present invention, autofocus (AF) processing, automatic exposure (AE) processing, automatic white balancing (AWB) processing, electronic flash pre-emission (EF) processing, or the like, according to the TTL system by controlling the exposure control unit 40 and the focusing control unit 42 based on a calculation result obtained by the image processing unit 20.

The exposure control unit 40 controls the shutter 12 which includes the diaphragm function, and includes a flash light amount control function in cooperation with the flash unit 48. The flash unit 48 includes a function of emitting AF auxiliary light and the light amount control function. The focusing control unit 42 controls focusing of the photographic lens 10. The exposure control unit 40 and the focusing control unit 42 are controlled by a TTL system. The zoom control unit 44 controls zooming of the photographic lens 10. The barrier control unit 46 controls an operation of the protection unit 102.

The image capturing apparatus 100 further includes a memory 52, a display unit 54, and a non-volatile memory 56. The memory 52 stores constants, variables, and programs used by the system control unit 50, while also storing a program diagram to be used in the AE processing. The program diagram is a table which defines a relationship between an aperture diaphragm diameter corresponding to an exposure value and a control value of shutter speed. The memory 52, like the memory 30, can be configured as any combination of volatile and non-volatile memory. Basic routines to transfer information between elements within the image processing apparatus 100 are stored in the non-volatile portion of the memory 52. The non-volatile portion of the memory 52 (and memory 30) can include, but is not limited to, read only memory (ROM), programmable ROM (PROM), electrically programmable ROM (EPROM), electrically erasable programmable ROM (EEPROM), flash memory and/or the like. The volatile portion can include any type of random access memory (RAM). The non-volatile memory 56 can include any type of random access memory (RAM).

The display unit 54 is configured as an LCD panel, a TFT-LCD panel, an OLED display panel, a TOLED display panel, a flexible display panel, a 3D display panel, and/or the like, and may also include an LED. One display unit 54 or a plurality of display units 54 may be provided near an operation unit 70 of the image capturing apparatus 100 so that it is easily visible for a user. A part of the functions of the display unit 54 may be installed within an optical finder 104, which is a window for confirming an object to be captured without using the electronic viewfinder function of the image display unit 28.

The display unit 54 can display an operational state of the image capturing apparatus 100, or status messages using characters, images, or a combination thereof, according to execution of a program by the system control unit 50. Contents displayed by the display unit 54 may include indications of single shot/continuous shooting, self timer, a compression rate, a number of recorded pixels, a number of recorded shots, a remaining number of shots, a shutter speed, an aperture value, exposure correction, and/or the like.

The display unit 54 may also display indications, such as electronic flash, red-eye reduction, F-number, macro shooting, buzzer setting, remaining amount of a clock battery, remaining amount of batteries, error information, information in a plurality of digits, a detached/attached state of a recording medium, a communication interface operation, date, time, and/or the like. Contents of the display unit 54 which are displayed in the optical finder 104 may include indications of in-focus, camera-shake warning, flash charge, shutter speed, aperture value, exposure correction, and/or the like.

The image capturing apparatus 100 further includes a mode dial 60, a look transform switch 62, a color output space switch 64, a shutter switch (SW1) 66, a shutter switch (SW2) 68, the operation unit 70, and a microphone 72, all of which can be used by a user to input operational instructions to the system control unit 50. These input units can be configured as standalone devices, such as a switch, a dial, a touch panel, etc., or a combination of a plurality of such devices.

The mode dial 60 is provides the user with the ability to switch between functional modes including power ON, power OFF, a customizable look management mode, manual shooting mode, automatic shooting mode, panoramic shooting mode, reproduction mode, multiple screen reproducing/erasing mode, personal computer (PC) connection mode, and/or the like. The look transform switch 62 provides the ability to switch between look transforms uploaded and/or transferred to the memory 30. The output color space switch 64 provides the ability to switch between output color spaces to which captured images are to be rendered. Selectable output color spaces include, but are not limited to, RGB, sRGB, esRGB, Adobe RGB, ProPhoto RGB, Wide Gamut RGB, Universal RGB, CIE RGB, Bruce RGB, SMPTE-240M, SMPTE-C, Chrome 2000 D50, Chrome 2000 D65, NTSC (National Television System Committee), PAL/SECAM (Phase Alternate by Line/Sequential Coleur a Memoir), and/or the like.

The shutter switch (SW1) 66 is turned ON by partially depressing, e.g. a half-stroke state, a shutter button (not shown). Turning ON the shutter switch (SW1) 66 initiates the start of an operation, such as AF process, AE process, AWB process, EF process, or the like. The shutter switch (SW2) 68 is turned ON by fully depressing, e.g. a full-stroke state, a shutter button (not shown). Turning ON shutter switch (SW2) 68 initiates the start of a series of operations including an exposure process (a process of writing a signal as image data read from the image sensor 14 in the memory 30 through the A/D converter 16 and the memory control unit 22), development process (a process of converting the image data into an image in arithmetic process performed by the image processing unit 20 or the memory control unit 22), and recording process (a process of reading out image data from the memory 30, causing the compression/expansion unit 32 to compress the image data, and writing the compressed image data in the recording medium 200 or 210.

The operation unit 70 includes various kinds of buttons and touch panels, such as a menu button, a set button, a macro selection button, a multi-screen reproduction and page-advance button, a flash setting button, a single-shot/serial-shot/self-timer selection button, and/or the like. The operation unit 70 also includes a forward (+) menu item selection button, a backward (−) menu item selection button, a forward (+) reproduction image search button, a backward (−) reproduction image search button, a shooting quality selection button, an exposure correction button, a date/time set button, and/or the like.

The image capturing apparatus 100 additionally includes a power supply control unit 80, connectors 82 and 84, a power supply 86, interfaces 90 and 94, connectors 92 and 96, a communication unit 110, a connector (antenna) 112, and a detachable recording medium detection unit 98.

The power supply control unit 80 includes a battery detection unit, a direct current (DC)-DC converter, and a switch unit for switching which elements of the image capturing apparatus 100 are to be energized. The power supply control unit 80 detects the attached/detached state of a battery, the battery type, and the remaining battery power level, and controls the DC-DC converter based on the detection results and an instruction from the system control unit 50. The power supply control unit 80 then supplies an appropriate voltage to each of the elements of the image capturing apparatus 100 for a predetermined period.

The power supply 86 may be one or a plurality of any standard form of power cell, including but not limited to, alkaline, lithium (Li), Li hydride, Li ion, Li polymer, nickel cadmium (NiCd), nickel metal hydride (NiMH), solar cells, and/or the like. Other types of alternating current (AC) or DC power sources may be used as well. For example, the power supply can include a primary battery, such as an alkaline battery, a lithium battery and/or the like, a secondary battery, such as a NiCd battery, a NiMH battery, a Li battery, and/or the like, and an AC adapter.

The interfaces 90 and 94 transmit and receive data to and from the recording media 200 and 210. Recording media 200 and 210 are detachably attached to the image capturing apparatus 100 and can be, but not limited to, memory cards, hard disks, floppy disks, flash memory, memory sticks, universal serial bus (USB) storage devices, etc. Recording media 200 and 210 include recording units 202 and 212 respectively, as well as interfaces 204 and 214 respectively. Further, recording media 200 and 210 include connectors 206 and 216 respectively for connecting with the image capturing apparatus 100.

Connectors 92 and 96 connect the image capturing apparatus 100 and the recording media 200 and 210. The detachable recording medium detection unit 98 detects whether the recording medium 200 or the recording medium 210 is connected to the connector 92 or the connector 96. The present exemplary embodiment describes a case where there are two systems of interfaces and connectors for attaching the recording medium. However, there can be any number of systems of interfaces and connectors for attaching the recording medium. Further, interfaces and connectors pursuant to different standards may be combined.

Cards in conformity with Personal Computer Memory Card International Association standards (PCMCIA cards) or cards in conformity with compact flash (CF) card standards may be used as the interfaces and connectors. In such a case, various communication cards, such as a local area network (LAN) card, a modem card, a universal serial bus (USB) card, an Institute of Electrical and Electronics Engineers (IEEE) 1394 card, a P1284 card, a small computer system interface (SCSI) card, a personal handyphone system (PHS), and/or the like, can be connected. According to this configuration, image data and management information attached to the image data can be transmitted and received between other peripheral devices, such as a computer, a printer, and/or the like.

The communication unit 110 includes various communication functions, including but not limited to, Recommended Standard (RS) 232, USB, IEEE 1284, IEEE 1394, SCSI, modem, LAN, wireless communication, and/or the like. The connector/antenna 112 connects the image capturing apparatus 100 with other devices via the communication unit 110.

The communication unit 110 and/or the connector/antenna 112 may be configured with one or more amplifiers, antennas, transceivers, or the like for enabling the transmission and/or reception of data over a variety of different data communication networks, formats, and protocols, including but not limited to GSM (Global System for Mobile Communication), GPRS (General Packet Radio Service), W-CDMA (Wideband Code Division Multiple Access), CDMA, CDMA2000, HSDPA (High-Speed Downlink Packet Access), wireless personal area networks (e.g. Bluetooth), wireless LANs (e.g. Wi-Fi), and/or the like.

Figure 12A:
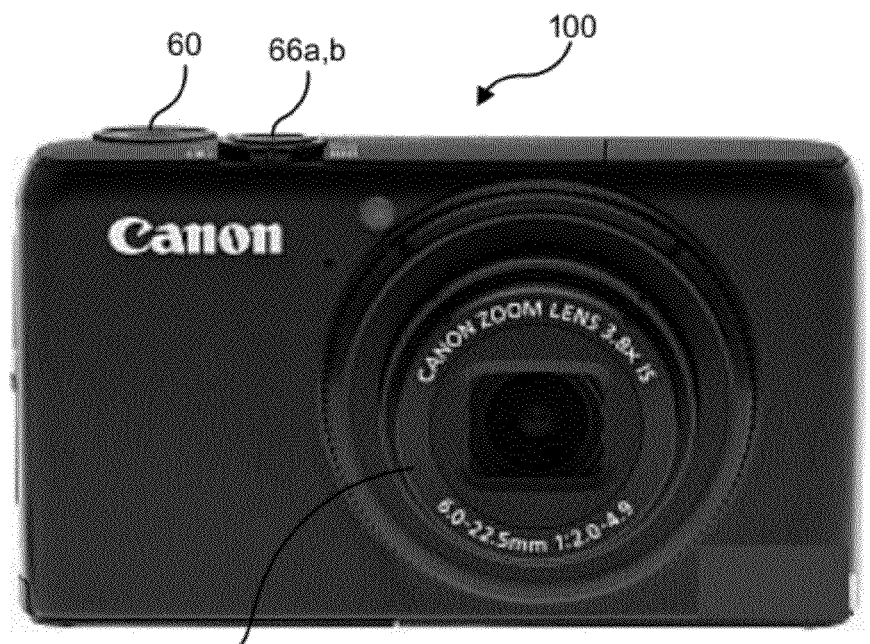
FIGS. 12A and 12B are front and rear views of an embodiment of an image capturing apparatus.
Figure 12B:
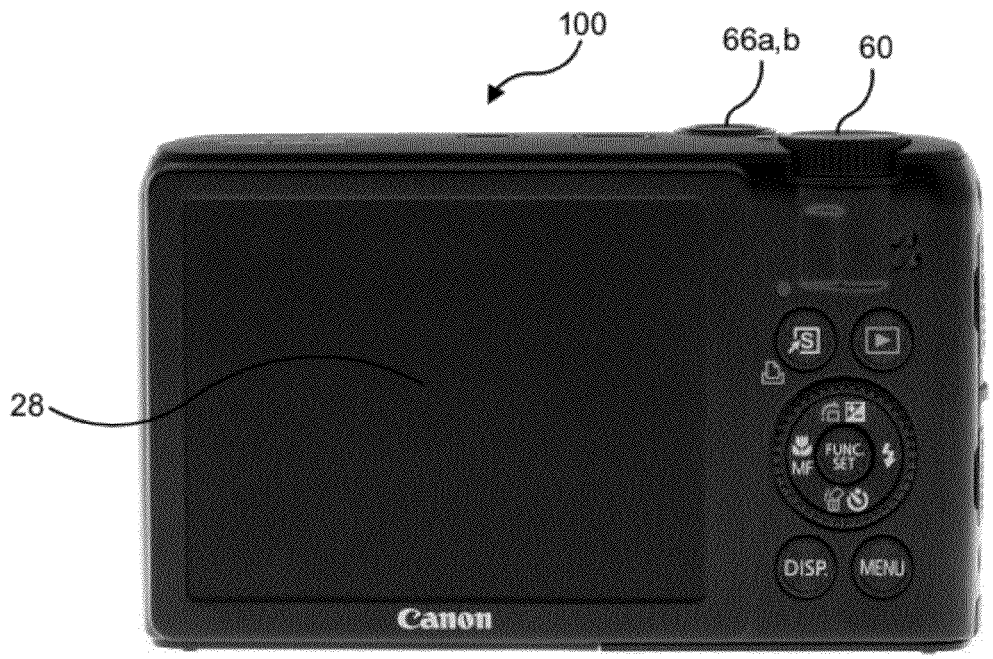

FIGS. 12A and 12B are front and rear views of an embodiment of an image capturing apparatus. FIGS. 12A and 12B illustrate an example of the appearance of the display 54, the mode switch 60, the shutter switch 66, and the protection unit 102 for the photographic lens. FIGS. 12A and 12B include additional components not shown in FIG. 11, such as a power supply button, a set button, an erase button, a cross button, a customizable control ring around the protection unit and lens on the front, and a four-way controller with a control dial around a button, where the four-way controller is surrounded by four buttons for performing various functions, such as shortcut, play, display, menu, etc.

The power supply button controls turning the image capturing apparatus 100 on or off. The set button is used for setting operational values or for determining menu items. The erase button is used to erase captured images. The cross button includes left, right, top, and bottom buttons, and is used to, among other things, transition between menu screens or to switch displayed images in a playback mode. The menu button displays a menu screen for changing shooting parameters or other settings of the image capturing apparatus 100, or for stopping the display of the menu screen(s). The display button provides for display of combinatorial information on the image display screen 28.

The processing described in the above embodiments may be realized by providing a storage medium, storing program codes of software realizing the above-described functions, to a computer system or apparatus. By reading the program codes stored in the storage medium with a computer, or central processing unit (CPU), micro-processing unit (MPU), and/or the like, of the system and apparatus and executing them, the functions of the above-described embodiments can be realized. In this case, the program codes read from the storage medium realize the functions according to the embodiments, and the storage medium storing the program codes constitutes an embodiment. The storage medium, such as a floppy disk, a hard disk, an optical disk, a magneto-optical disk, and/or the like, can be used providing the program codes. Also a CD-ROM (Compact Disc (CD) Read Only Memory), a CD-R (CD Recordable), CD-RW (CD ReWritable), a magnetic tape, a non-volatile memory card, ROM, and/or the like, can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part of or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An image capturing apparatus comprising:
    an image capture unit configured to capture an image, wherein the color signal values of the image are defined in a input-device color space;
    a memory configured to store the image;
    an interface unit configured to load at least one look transform into the image capturing apparatus; and
    a processing unit configured to
        convert the color signal values of the image from the input device color space into color signal values of the image in a device-independent color space,
        apply the at least one look transform to the color signal values of the image in the device-independent color space,
        convert the transformed color signal values of the image in the device-independent color space into color values of the image in an output-device color space, and
        generate a rendered image based on the color values of the image in the output-device color space.

2. The image capturing apparatus of claim 1, further comprising a display unit configured to display the rendered image.

3. The image capturing apparatus of claim 1, wherein the image capturing apparatus is one of a digital camera, a digital video camera, a portable communication terminal, a pager, a radio telephone, a personal digital assistant (PDA), and a Moving Pictures Expert Group Layer 3 (MP3) player.

4. The image capturing apparatus of claim 1, further comprising a color management system.

5. The image capturing apparatus of claim 4, wherein the image capturing apparatus uses the color management system to apply the look transform to the image.

6. The image capturing apparatus of claim 1, wherein the at least one look transform is configured to modify aspects of color appearance including lightness, chroma, and hue.

7. The image capturing apparatus of claim 6, wherein the aspects of color appearance of the image are modified based on style parameters and characteristics identified by an artist.

8. The image capturing apparatus of claim 1, wherein the look transform comprises one or more of a lookup table, a parameter to a mathematical formula, and computer instructions.

9. The image capturing apparatus of claim 1, wherein the output-device color space is selected from the group consisting of RGB, sRGB, esRGB, Adobe RGB, ProPhoto RGB, Wide Gamut RGB, Universal RGB, CIE RGB, Bruce RGB, SMPTE-240M, SMPTE-C, Chrome 2000 D50, Chrome 2000 D65, NTSC (National Television System Committee), CMYK, and PAL/SECAM (Phase Alternate by Line/Sequential Coleur a Memoir).

10. The image capturing apparatus of claim 1, wherein the interface unit is further configured to load the output-device color space from an external device into the image capturing apparatus.

11. A method for color management for use in an image capturing apparatus, the method comprising:
    storing at least one look transform on an imaging capturing apparatus, wherein the at least one look transform operates in a device independent color space;
    capturing an image in an input-device dependent color space with the image capturing apparatus;
    converting color signals of the image from the input-device dependent color space into the device-independent color space;
    applying the at least one look transform to the color signals of the image in the device-independent color space; and
    converting the transformed color signals of the image in the device-independent color space into color signals of the image in an output-device dependent color space.

12. The method of claim 11, further comprising rendering the color signals of the image in the output-device dependent color space in the image capturing apparatus; and displaying the rendered image on a display of the image capturing apparatus.

13. The method of claim 11, wherein the at least one look transform comprises one or more of a lookup table, a parameter to a mathematical formula, and computer instructions.

14. The method of claim 11, wherein the at least one look transform is configured to modify dimensions of color appearance of the image based on combinations of brightness (luminance), lightness, colorfulness, chroma, saturation, and hue.

15. The method of claim 14, wherein the dimensions of color appearance of the image are modified based on style parameters and characteristics identified by an artist.

16. The method of claim 11, wherein the rendered image includes modified color combinations of red, green, blue, cyan, magenta, yellow, and black.

17. A non-transitory computer readable medium having computer-executable instructions stored thereon that, when executed by one or more processors on a computing device, cause the computing device to perform operations comprising:
    storing at least one look transform on an imaging capturing apparatus;
    capturing an image in an input device dependent color space of the image capturing apparatus;
    converting color signals of the image from the input device dependent color space into a device-independent color space;
    transforming the color signals of the image in the device-independent color space with the least one look transform;
    converting the transformed color signals of the image from the device-independent color space to an output device dependent color space; and
    rendering the transformed color signals of the image in the output device dependent color space in the image capturing apparatus.

18. The image capturing apparatus of claim 1, wherein the processing unit is further configured to gamut map the transformed color signal values of the image in the device-independent color space to an output-device color gamut.

* * * * *